United States Patent [19]

Wehber

[11] Patent Number: 4,657,264
[45] Date of Patent: Apr. 14, 1987

[54] FLUID SEAL ASSEMBLY WITH SEGMENTED SUB-ASSEMBLY

[75] Inventor: Wayne F. Wehber, Horseheads, N.Y.

[73] Assignee: Ingersoll-Rand Company, Woodcliff Lake, N.J.

[21] Appl. No.: 793,918

[22] Filed: Nov. 1, 1985

[51] Int. Cl.$^4$ ............................................. F16J 15/38
[52] U.S. Cl. ..................................... 277/118; 277/84; 277/125; 277/198
[58] Field of Search ............................... 277/117–123, 277/125, 188 R, 188 A, 190–193, 195, 198, 199, 84

[56] References Cited

U.S. PATENT DOCUMENTS 4,556,223 12/1985 Van Loon et al. ............. 277/198 X

FOREIGN PATENT DOCUMENTS 372490 3/1923 Fed. Rep. of Germany ...... 277/143
549435 4/1932 Fed. Rep. of Germany ...... 277/143
559736 3/1944 United Kingdom ................ 277/106
823106 11/1959 United Kingdom .................. 277/16

Primary Examiner—Robert S. Ward
Attorney, Agent, or Firm—Bernard J. Murphy

[57] ABSTRACT

A pair of beveled-face load rings between which is confined a seal ring sub assembly formed of segmented, polytetrafluoroethylene seals. The seals too have beveled faces which slidably engage the beveled faces of the load rings and, thereby, are prevented from manifesting undue wear and extrusion. Three seal segments of the seal ring assembly form an inner seal which is slidably supported on a land formed on a three-segment outer seal of the seal ring assembly. A circumferential spring urges the segments of the inner and outer seals inwardly into sealing engagement with a to-be-sealed shaft or the like. Locating pins fixed in, and extending from, the outer seal nestably engage the inner seal segments and restrain the latter against unwarranted circumferential displacement.

13 Claims, 7 Drawing Figures

FLUID SEAL ASSEMBLY WITH SEGMENTED SUB-ASSEMBLY

This invention pertains to packing rings and packing ring assemblies which are used for fluid sealing along shafts, and the like, where cyclic pressures manifest themselves, and in particular to a packing ring assembly used for the aforesaid purpose having polytetrafluoroethylene seals in which, however, the seals are inhibited from experiencing undue wear and/or extrusion.

In fluid-pressure applications, and particularly in reciprocating gas compressors, the use of polytetrafluoroethylene seals, otherwise greatly to be desired, is limited as the seals are subject to undue wear and extrusion. It is an object of this invention, then, to set forth a packing ring assembly in which such seals are so disposed and configured as to minimize such wear and extrusion.

It is particularly an object of this invention to set forth a packing ring assembly comprising a pair of annular, load rings; and a seal ring assembly interpositioned between said load rings; wherein said seal ring assembly, and said load rings, have mutually-engaging surfaces which cooperate to restrain said seal assembly against undue radial displacement.

Further objects of this invention, as well as the novel features thereof, will become more apparent by reference to the following description, taken in conjunction with the accompanying figures, in which.

Figure 1:
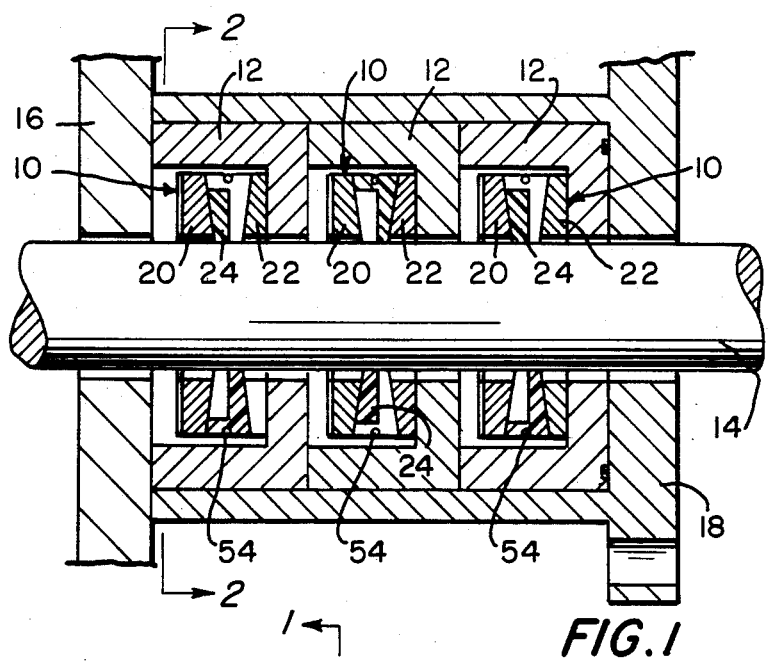
FIG. 1 is a cross-sectional view, taken along the axis of a seal housing, from section 1—1 of FIG. 2.
Figure 3:
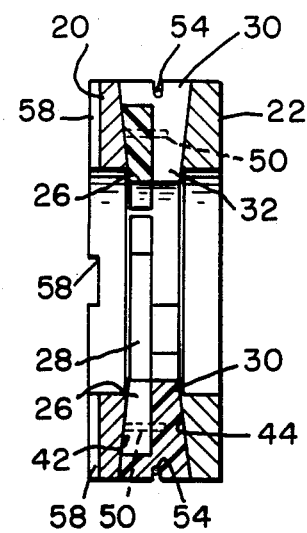
FIG. 3 is a cross-sectional view of one of the packing ring assemblies of FIG. 1 shown in greater scale than FIG. 1.
Figure 2:
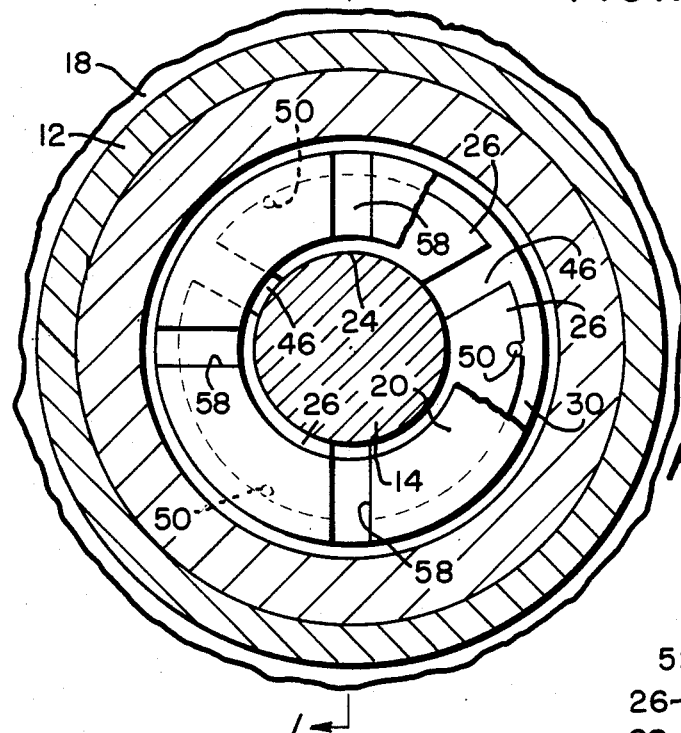
FIG. 2 is a cross-sectional view taken along section 2—2 of FIG. 1.
Figure 7:
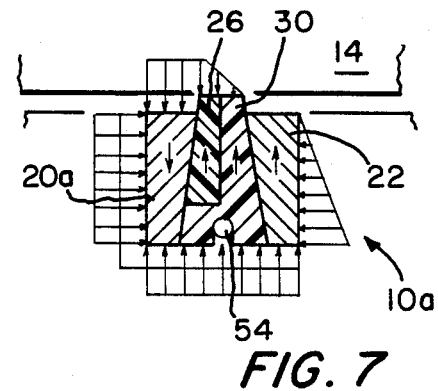
Figure 5:
Figure 6:
Figure 4:
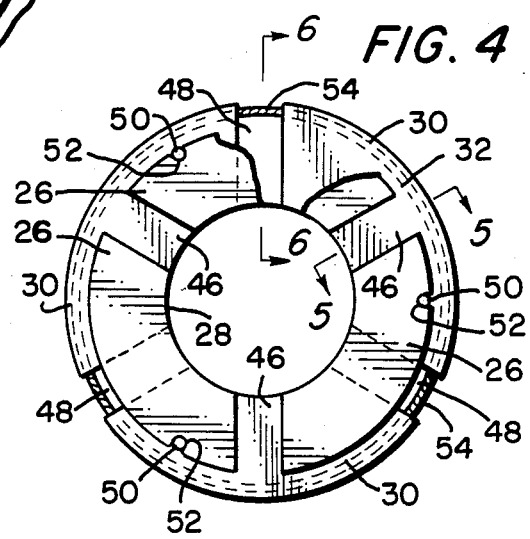
FIG. 4 is an end, elevational view taken from the left-hand side of FIG. 3.

FIGS. 5 and 6 are cross-sectional views taken along sections 5—5 and 6—6, respectively, of FIG. 4; and FIG. 7 is a load diagram shown in association with a cross-sectional view of half of one of the novel packing ring assemblies.

As shown in figures, packing ring assemblies 10, according to an embodiment of the invention, are seated in packing cups 12, the assemblies and cups 12 being set about a shaft 14. At the left-hand end of the shaft 14 cyclic high-pressure fluid obtains, whereas at the right-hand end of the shaft, ambient fluid pressure obtains. The shaft 14 penetrates seal housing elements 16 and 18.

Each fluid seal assembly 10 comprises a pair of annular load rings 20 and 22 between which is confined a seal ring subassembly 24. Each seal ring subassembly 24 comprises two pluralities of segments; three segments 26 define an inner seal ring 28, and three segments 30 define an outer seal ring 32. Segments 30 are right-angular in cross-section and define lands 34 upon which slidably to support segments 26, and further having shoulders 36 against which segments 26 seat. With the segments 26 and 30 joined, as aforesaid, the outer, side surfaces 38 and 40 of the subassembly 24 are inclined or beveled. Too, the engaging surfaces 42 and 44 of the load rings are beveled at the same angle (as the surfaces 38 and 40). Accordingly, the segments 26 and 30 are prevented from undue wear and/or extrusion; each thereof in this embodiment, as the cross-hatching indicates, is formed of a polymer, specifically: polytetrafluoroethylene. However, other materials, from polymides to metallurgical alloys could be used.

Each of the segments 26 and 30 subtends an arc of approximately one hundred degrees. Consequently, both the inner seal ring 28 and the outer seal ring 32 have gaps 46 and 48 formed therein, respectively. As can be seen best in FIG. 4, the gaps 46 in the inner seal ring 28 are shrouded by the outer seal ring 32. The gaps 48 in the outer seal ring 32 are bridged across by the inner seal ring 28. To insure that the segments 26 will maintain optimum positioning relative to segments 30, locating means are provided. The latter comprises locating pins 50. Each of the segments 30 has a pin 50 fixed therein, and extending therefrom, and each of the segments 26 has an arcuate recess 52 which nestably engages one of the pins 50. By this provisioning, each segment 26 is retained in its optimum positioning, relative to a segment 30, and prevented from becoming circumferentially displaced. An initial seating force for the seal ring subassembly 24 is provided by a circumferential expansion spring 54. The outermost surface of each of the segments 30 has a groove 56 formed therein in which to seat the spring 54.

The embodiment of the invention shown contemplates the use of the fluid seal assembly 10, as noted, in a gas compressor application. In such an application, then, it is anticipated that cyclic pressure will enter the seal cups 12 in the direction represented by the heavy arrow in FIG. 7, and the pressure forces will be distributed about the assembly 10 as indicated. The seal ring subassembly 24 is compressed against the shaft 14, yet restrained by the beveled provisioning.

While I have described my invention in connection with a specific embodiment thereof, it is to be clearly understood that this is done only by way of example, and not as a limitation to the scope of my invention, as set forth in the objects thereof, and in the appended claims. For instance, the load rings could be mirror images of each other. The fluid seal assembly 10a shown in FIG. 7 is representative of such an arrangement; in this assembly, the load rings 20a and 22 are just that, mirror images of each other. Load ring 20a hasn't radial grooves 58, for pressure distribution, as has load ring 20 in the other figures. Too, the use of pins 50 could be supplanted with lugs on the segments 30 and mating grooves therefor in the segments 26. These and other modifications of the invention will occur to others by taking teaching from my disclosure, and all of such are deemed to be within the ambit of my invention and embraced by the appended claims.

I claim:

1. A fluid seal assembly, comprising:
   a pair of annular, load rings; and
   a seal ring subassembly interpositioned between said load rings; wherein
   said seal ring subassembly, and said load rings, have mutually-engaging surfaces which cooperate to restrain said seal ring subassembly against undue radial displacement;
   said seal ring subassembly comprises two pluralities of segments; and
   each segment of said pluralities thereof subtends an arc of approximately one hundred degrees of arc.

2. A fluid seal assembly, according to claim 1, wherein:
   said load rings have first, parallel surfaces, and second, non-parallel, beveled surfaces;

said seal ring subassembly has external, non-parallel, beveled surfaces; and said second, beveled surfaces of said load rings, and said external, beveled surfaces of said seal ring subassembly, are slidably engaged with each other.

3. A fluid seal assembly, according to claim 1, wherein:

one of said pluralities of segments comprises an inner seal ring;

the other of said pluralities of segments comprises an outer seal ring; and said inner and outer seal rings have radial gaps formed therein.

4. A fluid seal assembly, according to claim 3 wherein:

said radial gaps formed in said inner seal ring are shrouded by said outer seal ring; and said radial gaps formed in said outer seal ring are bridged across by said inner seal ring.

5. A fluid seal assembly, according to claim 3 wherein:

said outer seal ring has a land formed thereon; and said inner seal ring is slidably supported on said land.

6. A fluid seal assembly, according to claim 5 wherein:

said outer seal ring has a shoulder, formed thereon, which extends from said land in an attitude normal to said land; and said inner seal ring has an outermost, peripheral surface which seats against said shoulder.

7. A fluid seal assembly, according to claim 1, wherein:

said load rings have a given, common, inside diameter; and said seal ring subassembly has an inside diameter which differs from said given inside diameter of said load rings.

8. A fluid seal assembly, according to claim 7, wherein:

said given inside diameter of said load rings is greater than said inside diameter of said seal ring subassembly.

9. A fluid seal assembly, according to claim 1 wherein:

said load rings, of said pair thereof, are mirror images of each other.

10. A fluid seal assembly, comprising:

a pair of annular, load rings; and a seal ring subassembly interpositioned between said load rings; wherein said seal ring subassembly, and said load rings, have mutually-engaging surfaces which cooperate to restrain said seal ring subassembly against undue radial displacement;

said load rings, of said pair thereof, are substantially mirror images of each other; and one of said load rings has a plurality of radially-disposed grooves formed in an outer surface thereof.

11. A fluid seal assembly, according to claim 2, further including:

spring means bound about said seal ring subassembly urging said seal ring subassembly to contract.

12. A fluid seal assembly, according to claim 3, wherein:

one of said inner and outer seal rings has orientation means, engageable with the other of said inner and outer seal rings, for restraining said other seal ring in a predetermined location, relative to said one seal ring, and inhibiting said other seal ring from circumferential displacement therefrom.

13. A fluid seal assembly, according to claim 12, wherein:

said orientation means comprises locating pins fixed in said outer seal ring, and projecting therefrom; and said inner seal ring has recesses formed therein which nestably engage said pins.

* * * * *